US012311388B2

(12) United States Patent
Göhmann

(10) Patent No.: US 12,311,388 B2
(45) Date of Patent: May 27, 2025

(54) MAGNETICALLY SUSPENDED AND ROTATED SEPARATOR

(71) Applicant: GEA MECHANICAL EQUIPMENT GMBH, Oelde (DE)

(72) Inventor: Rüdiger Göhmann, Oelde (DE)

(73) Assignee: GEA Mechanical Equipment GmbH, Oelde (DE)

( * ) Notice: Subject to any disclaimer, the term of this patent is extended or adjusted under 35 U.S.C. 154(b) by 910 days.

(21) Appl. No.: 17/431,851

(22) PCT Filed: Apr. 24, 2019

(86) PCT No.: PCT/EP2019/060456
§ 371 (c)(1),
(2) Date: Aug. 18, 2021

(87) PCT Pub. No.: WO2021/173578
PCT Pub. Date: Sep. 3, 2021

(65) Prior Publication Data
US 2022/0134357 A1 May 5, 2022

(30) Foreign Application Priority Data
Feb. 26, 2019 (WO) ................. PCT/EP2019/054662

(51) Int. Cl.
*B04B 9/04* (2006.01)
*B04B 1/08* (2006.01)
(Continued)

(52) U.S. Cl.
CPC .................. *B04B 9/04* (2013.01); *B04B 1/08* (2013.01); *B04B 1/12* (2013.01); *B04B 7/02* (2013.01);
(Continued)

(58) Field of Classification Search
CPC .... B04B 9/04; B04B 1/08; B04B 1/12; B04B 7/02; B04B 9/12; B04B 11/02; B04B 15/08
See application file for complete search history.

(56) References Cited

U.S. PATENT DOCUMENTS

| | | | |
|---|---|---|---|
| 2,948,572 | A | 8/1960 | Beams et al. |
| 3,613,989 | A | 10/1971 | Oyama et al. |

(Continued)

FOREIGN PATENT DOCUMENTS

| | | | |
|---|---|---|---|
| CN | 104540596 | A | 4/2015 |
| CN | 104582857 | A | 4/2015 |

(Continued)

OTHER PUBLICATIONS

Office Action mailed Oct. 25, 2022 in related/corresponding JP Application No. 2021-538093.
(Continued)

*Primary Examiner* — Amber R Orlando
*Assistant Examiner* — Shuyi S. Liu
(74) *Attorney, Agent, or Firm* — PATENT PORTFOLIO BUILDERS PLLC

(57) ABSTRACT

A separator includes a housing that is stationary during operation and is a tank having at least two openings. A drum is located inside the housing, has a vertical axis of rotation, and a number of openings to the housing corresponding to the openings of the housing. A single multi-part support and drive device with at least one control device and a motor including of a stator, a stator magnet assembly, and a rotor with a rotor magnet assembly, which keep the drum suspended inside the housing, radially and axially supported, and set in rotation. The stator magnet assembly is located outside the housing and the rotor magnet assembly is located inside the housing on the drum so that an air gap is formed
(Continued)

Figure 1:
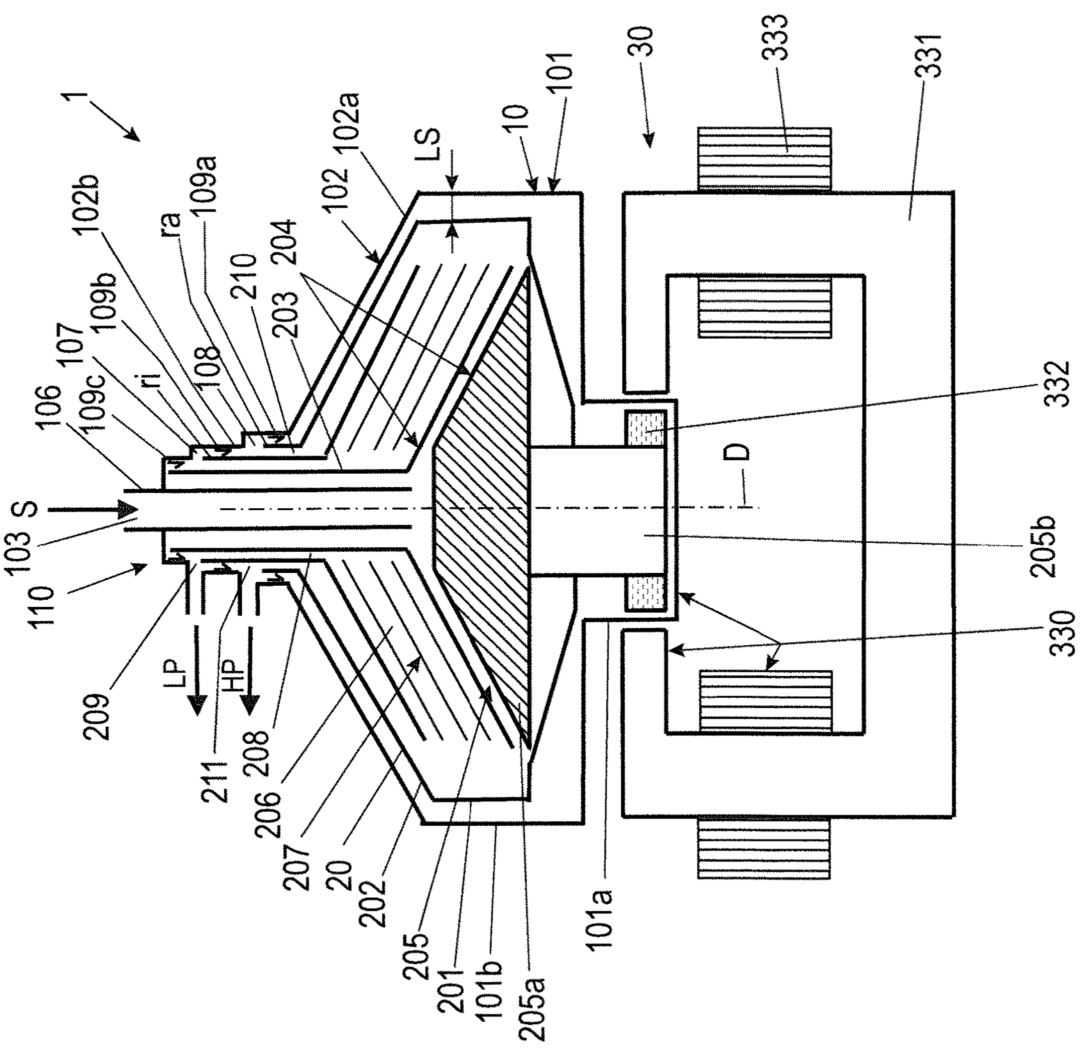

between the housing and the drum while the drum is rotating during operation. The axial support and centering of the drum is implemented by controlling the axial position of the rotor magnet assembly using the control device by actuating the motor.

16 Claims, 3 Drawing Sheets

(51) Int. Cl.

| | |
|---|---|
| ***B04B 1/12*** | (2006.01) |
| ***B04B 7/02*** | (2006.01) |
| ***B04B 9/12*** | (2006.01) |
| ***B04B 11/02*** | (2006.01) |
| ***B04B 15/08*** | (2006.01) |

(52) U.S. Cl.

CPC ................ *B04B 9/12* (2013.01); *B04B 11/02* (2013.01); *B04B 15/08* (2013.01)

(56) References Cited

U.S. PATENT DOCUMENTS

| | | | | |
|---|---|---|---|---|
| 3,774,376 | A | 11/1973 | Takashima et al. | |
| 4,262,840 | A | 4/1981 | Groenert et al. | |
| 6,424,067 | B1 | 7/2002 | Samways | |
| 6,976,948 | B1 | 12/2005 | Hamblad | |
| 9,115,725 | B2 | 8/2015 | Haefliger et al. | |
| 10,029,921 | B2 | 7/2018 | Quiter et al. | |
| 10,335,533 | B2 | 7/2019 | Heide | |
| 2015/0024922 | A1* | 1/2015 | Castillo Gonzalez .... | B04B 1/04 494/60 |
| 2016/0184836 | A1* | 6/2016 | Mackel ..................... | B04B 9/04 494/67 |
| 2016/0279315 | A1* | 9/2016 | Heide ....................... | B04B 9/04 |
| 2017/0008011 | A1 | 1/2017 | Burford et al. | |
| 2021/0031215 | A1 | 2/2021 | Göhmann | |
| 2022/0152631 | A1 | 5/2022 | Göhmann | |

FOREIGN PATENT DOCUMENTS

| | | | | |
|---|---|---|---|---|
| CN | 105916533 | A | 8/2016 | |
| CN | 111372687 | A | 7/2020 | |
| EP | 2273124 | A1 | 1/2011 | |
| EP | 2567754 | A1 | 3/2013 | |
| EP | 2273124 | B1 | 2/2015 | |
| EP | 2874752 | B1 | 2/2019 | |
| JP | S5775164 | A | 5/1982 | |
| JP | S63302969 | A | 12/1988 | |
| JP | 2001511702 | A | 8/2001 | |
| JP | 2015513445 | A | 5/2015 | |
| JP | 2015521542 | A | 7/2015 | |
| KR | 20150023739 | A | 3/2015 | |
| KR | 1020150036151 | A | 4/2015 | |
| WO | 2013116800 | A2 | 8/2013 | |
| WO | 2014000829 | A1 | 1/2014 | |
| WO | 2015110501 | A1 | 7/2015 | |
| WO | WO-2016142161 | A1 * | 9/2016 | ............... B04B 7/08 |
| WO | 2019101624 | A1 | 5/2019 | |

OTHER PUBLICATIONS

International Search Report mailed Jan. 3, 2020 in related/corresponding International Application No. PCT/EP2019/060456.

International Search Report mailed Oct. 29, 2019 in related/corresponding International Application No. PCT/EP2019/054662.

Written Opinion mailed Jan. 3, 2020 in related/corresponding International Application No. PCT/EP2019/060456.

Written Opinion mailed Oct. 29, 2019 in related/corresponding International Application No. PCT/EP2019/054662.

Office Action dated Sep. 12, 2024 in related/corresponding U.S. Appl. No. 17/432,597.

Office Action dated Aug. 24, 2023 in related/corresponding KR Application No. 10-2021-7030697.

Office Action dated Dec. 16, 2022 in related/corresponding IN Application No. 202147042866.

Office Action dated Aug. 19, 2022 in related/corresponding CN Application No. 201980092613.3.

Office Action dated Mar. 17, 2025 in related/corresponding U.S. Appl. No. 17/432,597.

* cited by examiner

MAGNETICALLY SUSPENDED AND ROTATED SEPARATOR

BACKGROUND AND SUMMARY OF THE INVENTION

Exemplary embodiments of the invention relate to a separator for separating a flowable suspension in a centrifugal field into at least two phases of different density.

A generic separator for separating a flowable product into different phases is known from WO 2014/000829 A1, which has a rotatable drum with a drum lower part and a drum upper part and a means for clarification arranged in the drum. One, several, or all of the following elements consist of plastic or a plastic composite material: the drum lower part, the drum upper part, the means for clarification. In this way it is possible to design a part of the drum or preferably even the entire drum—preferably together with the inlet and outlet systems or areas—for single use, which is of particular interest and advantage with regard to the processing of pharmaceutical products such as fermentation broths or the like, since after operation for the processing of a corresponding product batch in preferably continuous operation during the processing of the product batch, no cleaning of the product-contacting parts of the drum has to be carried out, but the drum as a whole can be replaced. Especially from a hygienic point of view, this separator is thus very advantageous. In order to achieve a physical separation between this disposable drum and the drive, a contact-free coupling between the drive and the drum is advantageous. WO 2015/1100501 A1 discloses a device for separating blood into two phases of different density, the device containing a magnetic drive device and a container that is set into rotary motion about its own axis by the drive device. The container has at least one open end and in this at least one inlet. The container is magnetically suspended.

The problem is the unsatisfactorily solved bearing of the open, cup-like rotor, which therefore tends to relatively strong precession movements and is therefore limited with regard to the rotational speed and thus also with regard to the separation performance with which the device can be operated.

Exemplary embodiments of the invention are directed to solving this problem.

The invention solves this object by providing a separator for separating a flowable suspension in a centrifugal field into at least two flowable phases of different density, which separator comprises the following: a housing that is stationary in operation and is designed in the manner of a container having at least two or more openings, wherein these openings comprise an inlet opening for an incoming suspension and at least one outlet or more outlets for one or more flowable phases, optionally of different density, which are preferably each associated with annular spaces of the housing, and a rotatable drum arranged inside the housing and comprising a vertical axis of rotation and having a number of openings corresponding to the housing, which openings correspond to the openings of the housing, a multi-part support and drive device, comprising at least one control device and an electric motor, consisting of a stator, a stator magnet assembly and a rotor magnet assembly, by means of which the drum is held in suspension inside the housing, is radially and axially supported and is set in rotation, wherein the stator magnet assembly is arranged outside the housing and the rotor magnet assembly is formed inside the housing on the drum, so that an air gap LS is formed between the housing and the drum during operation, wherein axial centering and support of the drum is realized exclusively by controlling the position of the rotor magnet assembly by the control device by actuating the electric motor, and wherein one or more sealing rings is/are arranged between the drum and the housing, which sealing rings additionally radially support the drum in the region in which they are arranged during operation.

The axial and the essential radial centering of the drum is achieved with the aid of the control device, which regulates the rotary motion during operation in such a way that a largely defined axial or vertical arrangement of the rotor magnet assembly and thus of the rotor and the associated drum, which rotates within the stator magnet assembly, is ensured during operation. It is provided that the sealing ring or rings guide the drum radially in the area in which they are arranged in a complementary bearing manner during operation.

As a result, the drum with the support and drive device can not only be supported with respect to a radial direction, but can also be held in suspension and centered in an axial direction. Due to the intended disposable concept of the drum as well as the housing, the axial bearing properties of the rotor magnet are sufficient to ensure sufficient axial bearing of the drum for the present application until the processing of the intended amount of suspension is completed. To achieve a higher speed and thus a higher separation performance of the separator, it is also advantageous that the one or more mechanical seals guide the drum radially at its upper end during operation. In this way, further radial guidance of the drum is achieved simply by design.

The term “housing” should not be interpreted too narrowly. It includes completely inherently rigid containers, but also containers which are not inherently rigid, either completely or in sections.

It is advantageous if the sealing ring or rings are distributed adjacent to the annular spaces between the drum and the housing in order to seal them without leakage. It is also advantageous if the outlets and/or the annular spaces between the drum and the housing are sealed with one or more seals, in particular sealed against each other. In this way, the flows of suspension, light phase, and possibly heavier phase into or out of the separator are reliably separated from each other.

It can be provided that the sealing ring(s) may be designed as a mechanical seal. This makes sealing with commercially available machine elements inexpensive and simple in terms of design.

It may be provided that the inlet is formed as an inlet pipe extending vertically from the top towards the center of the housing and that the two outlets are radially aligned.

It may further be provided that a distributor and a separating means, in particular a disk pack, are arranged in the drum to ensure a sufficient separating effect.

It is further preferred that a first fluid outlet is formed on the drum in the upper axial section of the drum.

It may be provided that a second fluid outlet is formed on the drum in the upper axial region adjacent to the first fluid outlet.

Optionally, it can be provided that at least one of the liquid drains is assigned a device for adjusting the separation zone within the drum.

Then—advantageously for disposable operation and/or leakage-free processing—it can be provided that the housing has only the two or three openings and is otherwise designed in a hermetically closed manner.

It can also be advantageous if the seal(s) is/are designed as a mechanical seal or Elring seal. This makes sealing with commercially available machine elements inexpensive and simple in terms of design.

To achieve particularly high speeds and for particularly stable operation, it may be advantageous to have the first fluid outlet on the drum in the upper axial region—preferably at the upper axial end—and the second fluid outlet likewise in the upper axial region of the drum.

It can be further advantageously provided that the housing has only the two or three openings and is otherwise designed in a hermetically closed manner. This makes it easier to create a separator that has the disposable components "drum" and "housing", whereas at least parts of the support and drive device are reusable.

According to a further development, which, however, is also to be understood as an independent invention, it is provided that the housing is designed as a container that is not inherently rigid in its entirety or in sections but is deformable, preferably flexible. In these non-inherently rigid sections, the housing may still be stable enough to stand on its own as a whole, but it is not as inherently rigid as a rigid plastic container, for example a dimensionally stable plastic tank, but can easily be deformed by hand or by touch without major force. In particular, it is not so inherently rigid that it is possible to ensure a sufficient air gap without stabilizing the shape by an auxiliary means.

In this way, the housing can be made particularly simply from relatively little plastic material and, moreover, from a relatively inexpensive plastic material, and can be disposed of in a particularly uncomplicated manner. Thus, in other words, it is provided that the container as a whole or at least in sections is designed like a flexible bag.

It may be provided that the container has one or more inherently rigid sections in some areas and one or more flexible sections in some areas. In particular, it can be provided that the container has one or more inherently rigid sections in some areas and one or more flexible sections in some areas, which may connect the inherently rigid sections.

It can further be advantageously provided that the container has one of the inherently rigid sections at each of its two axial ends. One of these sections can be provided in the area of the inlets and outlets and one in the area of the rotor magnet assembly, where an inherently rigid design is particularly advantageous for ensuring a particularly defined distance of the housing from the drum.

According to a further development, it can be advantageously provided that in operation the non-inherently rigid section(s) or the overall non-inherently rigid container are set by means of an auxiliary means into a state in which it is ensured that the overall non-inherently rigid container or the non-inherently rigid section(s) do not directly touch the drum in operation.

For this purpose, it can be provided, for example, that the auxiliary means is designed as a framework with which or on which the container is held in a stretched-out state.

It can also be provided that the frame is designed as a frame arranged outside the housing, on which the container is held inside in a stretched-out state. In this way, the container can be stretched out particularly easily on the inside of the frame and the frame can be used for multiple applications.

It may be provided that the housing is made of a plastic or a plastic composite material. It can also be provided that the drum is predominantly, preferably apart from one or more components of the drive (e.g., the rotor magnet assembly), made of a plastic or a plastic composite material. This is particularly advantageous for a use of a separator for a one-time operation for processing a limited amount of suspension and optionally for disposal after this processing.

BRIEF DESCRIPTION OF THE DRAWING FIGURES

Figure 2A:
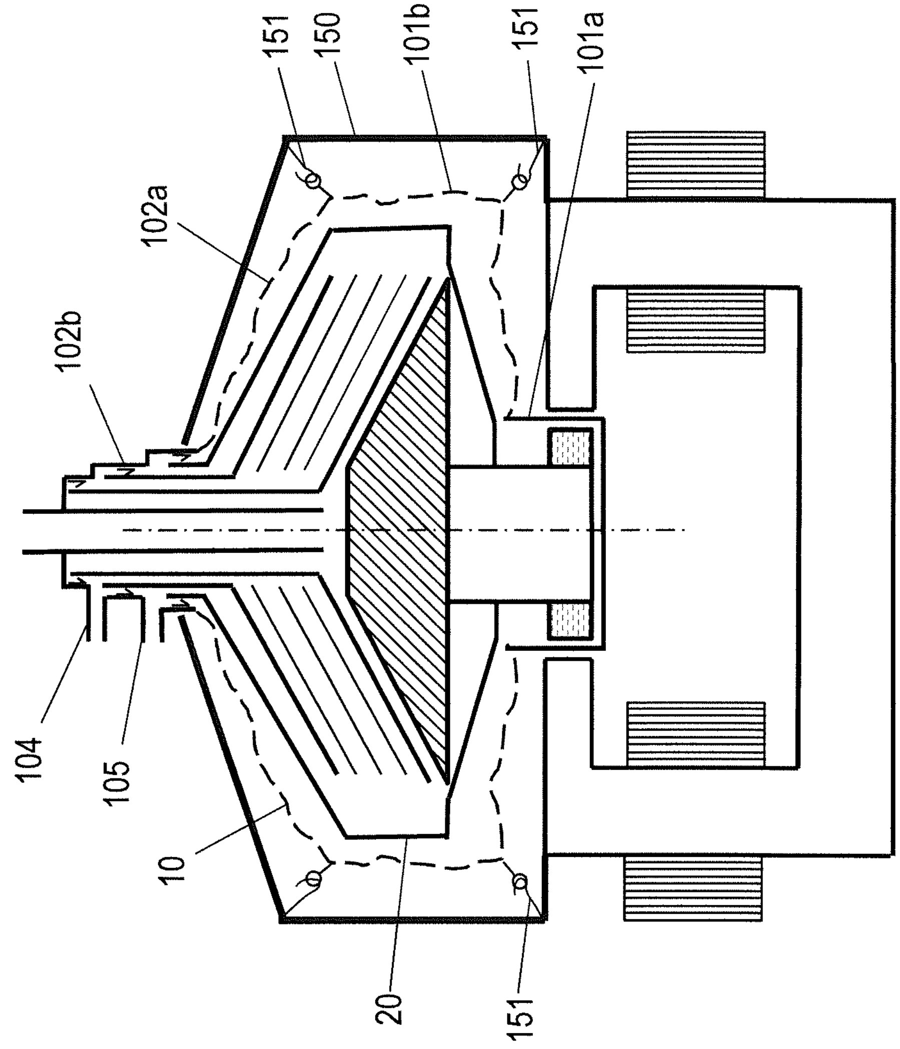
Figure 2B:
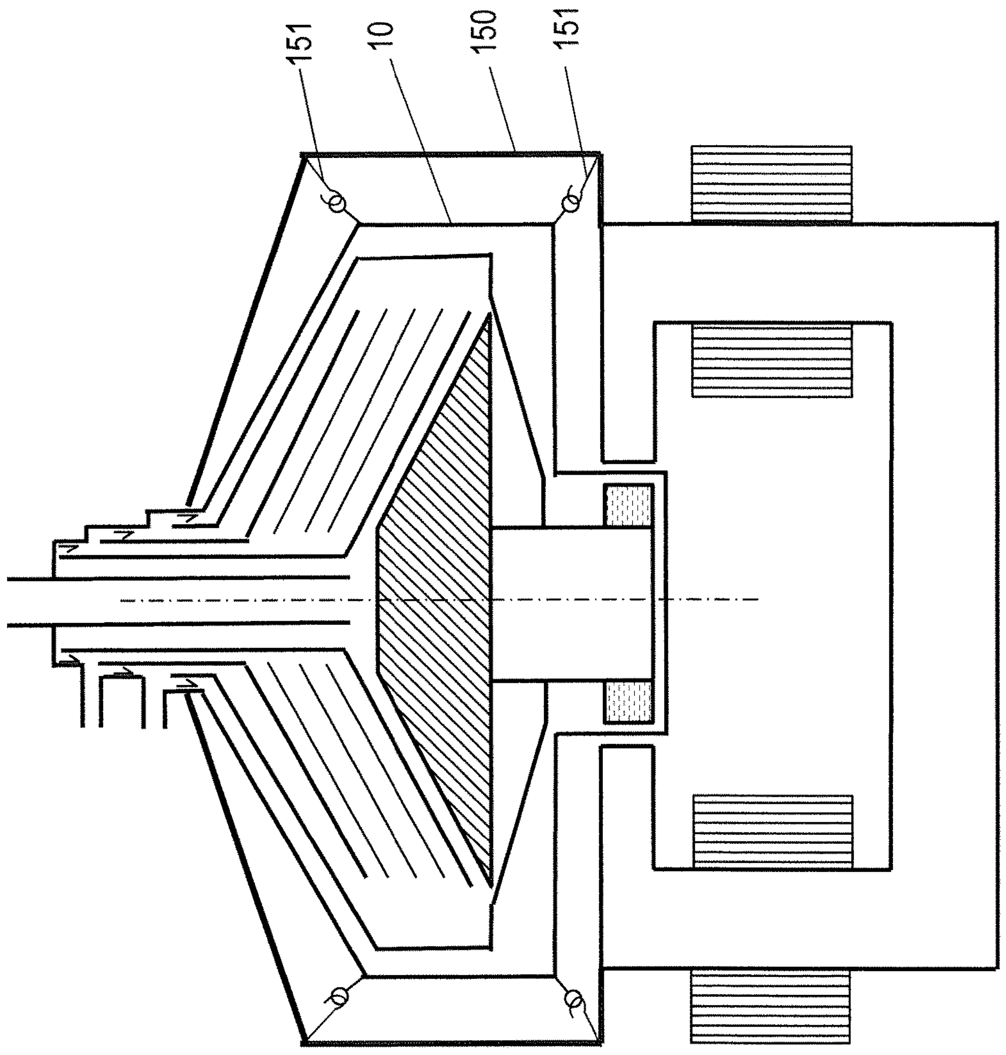

In the following, the invention is described in more detail by means of exemplary embodiments with reference to the drawing, wherein further advantageous variants and designs are also discussed. It should be emphasized that the exemplary embodiment discussed below is not intended to describe the invention conclusively, but that variants and equivalents not shown are also feasible and are covered by the claims, wherein:

FIG. 1: shows a schematic representation of a separator according to the invention;

FIG. 2*a*: shows the separator with a receiving container surrounding it in a not yet stretched-out state; and FIG. 2*b*: shows the separator with a receiving container surrounding it in a stretched-out state.

DETAILED DESCRIPTION

The separator 1 of FIG. 1 has a housing 10, which is stationary during operation. This housing preferably consists entirely or at least in sections of a plastic or plastic composite material.

According to FIG. 1, the housing is formed as a substantially inherently rigid stable container which, without further aid, is stable enough to maintain a defined distance in operation from a rotor rotating within it.

According to FIGS. 2*a* and 2*b*, on the other hand, the housing 10 is designed as a container that is inherently rigid and dimensionally stable only in sections and otherwise as a non-inherently rigid and flexibly deformable container. This container therefore behaves overall or at least in sections like a deformable bag. This is described in more detail below with reference to FIGS. 2*a* and 2*b*. The term "housing" thus includes, on the one hand, containers that are so inherently stable or inherently rigid that they remain spaced apart from the drum during operation and, on the other hand, containers that are not inherently rigid either in their entirety or in sections and which can then optionally be held in an inherently rigid state by an auxiliary means such as a support structure 150—e.g., designed as a frame. According to FIGS. 2*a* and 2*b*, the frame is an external frame outside the container, which can be held in a stretched-out manner in said frame by tensioning means 151 such as tensioning belts, rubber rings or the like (FIG. 2*a*) and (in FIG. 2*b*) is also kept in a stretched-out state during operation.

Here, the housing 10 has a lower section 101 and an upper section 102. The lower section 101 may be configured as a cylindrical section. This may in turn be divided into one or more cylindrical regions 101*a*, 101*b* of different diameters.

For example, the lower section 101 may include a first lower—here cup-like—region 101*a* having a first diameter and having a closed bottom at the lower end. This first section 101*a* is substantially for receiving drive components of a drive of a rotor on a drum. The first section 101*a* may be followed vertically upwardly by a second section 101*b*, preferably of larger diameter.

Axially upwards, the lower section 101 is thus followed by the upper section 102. This can be provided with a conically tapering design at least in a lower region 102*a*.

Towards the top, this conical section 102*a* can be adjoined by a housing head 102*b*. This can in turn be of cylindrical design and stepped in itself.

This shape is preferred, but not mandatory. In particular, the lower section 102 can also be designed in a conical or sectionally conical and cylindrical manner.

According to FIGS. 2*a* and 2*b*, in particular the lower cup-like region 101*a* and the housing head 102*b* may be inherently rigid and may be designed, for example, as injection-molded plastic elements. The region between these elements 101*a* and 102*b* can consist of a flexible plastic tube section 101*b*, 102*a* (FIG. 2*a*). This can be stretched out (FIG. 2*b*). Thus, it may be attached to an external framework 150, such as with tensioning means 151 such as pulling means and hooks, or in some other way, so that as a result of this tensioning (FIG. 2*b*) it forms a housing 10 that is sufficiently stable in operation so that in operation it does not contact a rotating rotor, which will be explained below and which it surrounds.

The housing 10 is designed in the manner of a container that is advantageously hermetically closed except for openings, in this case at least two or three openings (to be discussed). These openings are an inlet opening 103 and one or two fluid outlets 104, 105. If only a single outlet opening is provided, a solid phase in batch operation can also be collected internally in a drum and disposed of with the entire separator after a complete processing of an intended amount of suspension to be processed (not shown here).

The inlet opening 103 is penetrated by an inlet tube 106 that extends vertically from above toward the center of the housing 10. The two fluid outlets 104, 105 here may extend substantially radially.

The first fluid outlet 104 and, here, the further second fluid outlet 105 are formed in the housing head 102*b* of the upper section 102 of the housing 10. Preferably, they are formed directly at the upper end of the housing 10.

Upstream of the one or two or more outlets 104, 105 are one or more annular spaces 107, 108 of the housing. The one or more outlets 104, 105 allow one or more flowable phases to drain from the one or more annular spaces 107, 108 during operation of the then rotating drum 20. The significance and beneficial effect of the one annular space or the two or more annular spaces 107, 108 will be further explained below.

The fluid outlet(s) 104, 105 of the housing are designed here as nozzles leading radially out of the housing 10, to which lines, in particular hoses or the like (not shown here), can be connected. Preferably, one inlet and several outlet lines, in particular outlet pipes or hoses, are connected to the inlets and outlets. These can in turn have a certain inherent rigidity so that they further stabilize the arrangement, in particular the housing, and hold it spatially to a limited extent.

Inside the housing 10, a rotatable rotor of a drive device is arranged on and with a rotatable drum 20 with an imaginary "ideal" axis of rotation D, which is a vertical axis of rotation. The real axis of rotation deviates from the vertical due to precession movements.

The drum 20 and its components are also preferably made entirely or in any case for the most part (ideally except for magnets to be explained) of a plastic material or of a plastic composite material. The drum 20 may also have a lower cylindrical and/or conical section 201 and an upper conical section 202, as well as a type of drum head consisting of cylindrical projections extending vertically upward in the orientation of FIGS. 1, 2*a*, and 2*b*.

The inlet pipe 106 of the housing 10, like the housing 10, may be stationary in operation. It extends vertically from above through the inlet opening of the housing 10 into the drum 20 into a distributor pipe 203 of the distributor 204 of the drum 20, which is concentric with the inlet pipe. The distributor forms part of the rotating system (rotor or drum).

Upstream of the one or more fluid outlets 104, 105 are in turn the one or more annular spaces 107, 108 of the housing. The outlets allow fluid to drain from the annular spaces 107, 108 during operation of the then rotating drum 20.

In order to seal the fluid outlet(s) 104, 105 and/or the annular spaces 107, 108, in particular to seal them against each other, one or more, here three, seal(s) 109 are provided between the drum 10 and the housing 20. These seals are designed here as sealing rings.

In the example of FIG. 1, three radially acting sealing rings 109*a*, 109*b* as well as 109*c* in an air gap between the drum 20 and the housing 10 seal an axially upper outer region radially outside on the drum 20 against an axially upper and radially inner region of the housing 10.

The sealing ring(s) 109 is/are preferably designed here as mechanical seal(s). Alternatively, other sealing rings such as Elring seals can also be used.

Due to the intended disposable concept of the drum 20 as well as the housing 10, the plain bearing characteristics of the mechanical seals 109 are sufficient to ensure adequate radial bearing support of the drum 20 in the intended one-time operation.

The plain bearing characteristics of the mechanical seals 109 guide the drum 20 radially at its upper end (also called the drum head) during operation.

Compensating and oscillating movements of the drum 20 due to the precession of the drum 20 can be compensated for by a rotor magnet 332, to be explained later, in interaction with a suitable control system in a manner sufficient for one-time operation.

First, the further construction of the rotor should be explained in more detail.

The distributor pipe 203 of the distributor 204 opens downward into radial distributor channels 205, which lead into a separation chamber or centrifugal chamber 206. A clarifying agent such as a disk pack 207 may be disposed in this separation chamber 206. The distributor 204 may have a distributor base 205*a*, which in turn has a lower cylindrical extension 205*b* projecting downward axially from the drum 20, in particular from its cylindrical section 201.

In the separation chamber 206, a suspension S to be processed, which is fed into the drum 20 through the feed pipe 106, is separated by centrifugal force into at least two flowable phases LP and HP of different density during the driven rotational operation of the drum 20. The lower-density phase LP flows radially inwardly in the separation chamber 206, where it is discharged upwardly through a first discharge channel 208 into the radial discharge 209 and is ejected radially through the radial discharge 209 from the rotating drum into the first annular space 107. Here, the phase LP leaves the drum 20 at a radius ri. From there, it flows—circling in the annular space due to its momentum—out of the housing 10 through the upper fluid outlet 104.

The higher-density phase HP flows radially outwardly in the separation chamber 206 and is expelled upwardly through a second discharge channel 210 into the radial discharge 211 and is expelled radially through the latter from the rotating drum into the second annular space 108. Here the phase HP leaves the drum 20 at a radius ra. From there it flows—circling in the annular space 108 due to its momentum—out of the housing 10 through the lower fluid outlet 105. It may also be provided that this phase or another or different phase—e.g., a waste phase to be disposed of—collects externally in the drum 20 during operation if it consists of solids, so that the solid phase is not drained. The drum 20 then has only a single discharge.

The ratio of ra to ri can be used to adjust the radius of the separation zone between the two phases within the disk pack and thus realize a regulation of the flow rates of the individual phases. The radius of the separation zone can also be changed by throttling the fluid outlets 104 and/or 105.

In the vertical region below the annular spaces, the housing 10 and the drum 20 are spaced apart by an air gap LS. This is advantageous because a high rotational speed of the drum 20 can be achieved relatively easily in this way. In this area, the air gap LS is not filled with one of the phases HP, LP to be discharged.

The drum 20 is suspended and rotated within the housing 10 by a single electromagnetic support and drive device 30. The single electromagnetic support and drive device 30 has a single bearing and drive unit.

The electromagnetic support and drive device 30 comprises an electric motor 330, which includes a type of base having a stator 331 with a stator magnet assembly 333 external to the housing 10. The housing 10 may be placed on the base during operation. A control unit may also be provided outside the housing 10. Thus, these drive components are advantageously reusable and not intended for disposable batch operation.

In contrast, a rotor with a rotor magnet assembly 332 may be formed inside the housing 10 on the drum 20 and may be provided for disposable operation only. This rotor magnet assembly 332 may be disposed of after operation or, alternatively, may be reused after suitable disposal of the remainder of the housing 10 and drum 20.

The rotor magnet assembly 332 is then arranged on the drum 20 within the housing 10. This may be formed on the drum 20 in a lower region extending into the lower cup-like section of the housing, but which the drum 20 does not contact during operation.

As a result of suitable control of the drive by a control unit, the entire rotor is set in rotation, wherein, due to the magnetic effect between the stator and rotor, it is not only rotated but enters a state of suspension that is maintained during operation.

The axial and radial centering of the drum 20 is effected by the control device, which in operation regulates the rotary movement and ensures in a regulating manner that in operation a largely defined axial or vertical arrangement of the rotor magnet assembly and thus of the rotor, which rotates within the stator magnet assembly, is ensured.

The axial centering of the rotor magnet 332 and thus of the drum 20 is thus realized entirely or substantially solely by the control and regulation of the stator magnet 333 by the control unit. This regulation can be supported by one or more sensors on the non-rotating and/or on the rotating system.

In this way, the drum 20 can not only be supported with respect to a radial direction, but can also be held in suspension and centered in an axial direction. Due to the intended disposable concept of the drum 20 as well as of the housing 10, sufficient radial and also axial bearing of the drum 20 is ensured for the present application.

The drive device 30 can be operated electromagnetically. However, a drive via rotating permanent magnets can also be realized.

Suitable support and drive devices 30 are used and offered by the company Levitronix, e.g., for driving centrifugal pumps (EP2273124B1). The control is easily programmable by the person skilled in the art, optionally accompanied by tests, in such a way that the radial and bearing of a separator is ensured.

In operation, the drum 20 thus rotates. In this case, it is held axially in suspension and radially centered. Preferably, the drum 20 is rotated at a speed of between 1,000 and 20,000 revolutions per minute. The forces generated by the rotation lead to the separation of a suspension to be processed into different phases and, optionally, to their discharge, as already described in detail above.

With the described embodiment, it is again possible to create a separator together with housing, which can be designed for single use except for the drive system and parts of the bearing, which is again of interest and advantage in particular with regard to the processing of pharmaceutical products such as fermentation broths or the like, since after operation for processing a corresponding product batch in preferably continuous operation during the processing of the product batch, no cleaning of the drum 20 has to be carried out, but the drum 20 together with housing 10 can be replaced as a whole. Optionally, individual elements such as magnets can be suitably recycled.

For certain applications, it may be necessary for all components that come into contact with the product to be completely germ-free or sterilized. This requires sterilization of these components with e.g., beta rays. The materials may have to be suitable for such irradiation.

According to one variant, the running surfaces of the seals can consist of steel sleeves. In order to be able to sterilize these as well, they must be made of autoclaved steel.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

| List of reference numerals | |
|---|---|
| Separator | 1 |
| Housing | 10 |
| Lower cylindrical section | 101 |
| Upper conical section | 102 |
| Inlet opening | 103 |
| Fluid outlets | 104, 105 |
| Inlet pipe | 106 |
| Annular spaces | 107, 108 |
| Seal | 109, 109a, 109b, 109c |
| Housing head | 110 |
| Drum | 20 |
| Lower cylindrical section | 201 |
| Upper conical section | 202 |
| Distributor pipe | 203 |
| Distributor | 204 |
| Distributor channels | 205 |

-continued

| List of reference numerals | |
|---|---|
| Separation chamber | 206 |
| Disk pack | 207 |
| Distributor base | 205a |
| Cylindrical extension | 205b |
| Discharge channel | 208 |
| Discharge | 209 |
| Discharge channel | 210 |
| Discharge | 211 |
| Support and drive device | 30 |
| Electric motor | 330 |
| Stator | 331 |
| Rotor magnet | 332 |
| Stator magnet | 333 |
| Axis of rotation | D |
| Suspension | S |
| Flowable phases | LP and HP |
| Air gap | LS |
| Radius | ri |
| Radius | ra |

The invention claimed is:

1. A separator for separating a flowable suspension in a centrifugal field into at least two phases of different density, the separator comprising:

a housing, which is stationary in operation and is a container, wherein the housing has at least two or more openings comprising an inlet opening for an inflowing suspension and at least one outlet or a plurality of outlets for flowable phases of different density, and wherein the plurality of outlets are respectively assigned annular spaces of the housing;

a rotatable drum arranged inside the housing and having a vertical axis of rotation, wherein the rotatable drum comprises a number of openings corresponding to the openings of the housing;

a single multi-part support and drive device, which comprises at least one control device and an electric motor, wherein the electric motor consists of a stator, a stator magnet assembly, and a rotor having a rotor magnet assembly, wherein the electric motor holds the rotatable drum in suspension within the housing, radially and axially supports the rotatable drum, and sets the rotatable drum in rotation, wherein the stator magnet assembly is arranged outside the housing and the rotor magnet assembly is formed inside the housing on the rotatable drum so that an air gap LS is formed between the housing and the rotatable drum during rotation of the rotatable drum in operation, wherein the single multi-part support and drive device axially bears and centers the rotatable drum by regulating an axial position of the rotor magnet assembly by the at least one control device by controlling the electric motor;

one or more sealing rings are arranged between the rotatable drum and the housing, wherein the one or more sealing rings radially support the rotatable drum in an area in which the one or more sealing rings are arranged during operation; and a distributor and a disk pack are arranged in the rotatable drum.

2. The separator of claim 1, wherein the one or more sealing rings is/are distributed adjacent to the respectively assigned annular spaces between the rotatable drum and the housing in a region of the at least one outlet or the plurality of outlets.

3. The separator of claim 1, wherein the one or more sealing ring(s) is/are a mechanical seal.

4. The separator of claim 1, wherein the inlet accommodates an inlet pipe extending vertically from above in a direction of a center of the housing, and at least one outlet or the plurality of outlets is/are radially oriented.

5. The separator of claim 1, wherein one of the number of openings of the rotatable drum is a first discharge formed on the rotatable drum in an upper axial section of the rotatable drum.

6. The separator of claim 5, wherein another one of the number of openings of the rotatable drum is a second discharge line formed on the rotatable drum in the upper axial region adjacent to the first discharge.

7. The method of claim 1, wherein the housing exclusively comprises the at least two or more openings as two openings and is otherwise hermetically closed, or the housing exclusively comprises the at least two or more openings as three openings and is otherwise hermetically closed.

8. The separator of claim 1, wherein the housing container is a completely or sectionally non-inherently rigid, shape-changing container.

9. The separator of claim 8, wherein the container, or at least sections thereof, are configured as a bag.

10. The separator of claim 8, wherein the container has one or more inherently rigid sections in some areas and one or more non-inherently rigid sections in other areas.

11. The separator of claim 10, wherein the container has one of the inherently rigid sections at each of two axial ends of the container.

12. The separator of claim 10, wherein the one or more non-inherently rigid sections or an overall non-inherently rigid container are placed in a state during operation by an auxiliary means, which ensures that the overall non-inherently rigid container or the one or more non-inherently rigid sections do not directly contact the rotatable drum during operation.

13. The separator of claim 12, wherein the auxiliary means is a framework with which or on which the container is held in a stretched-out manner.

14. The separator of claim 13, wherein the framework is a framework arranged outside the housing, on which the container is held inside in a stretched-out state.

15. The separator of claim 1, wherein the housing consists of a plastic or a plastic composite material.

16. The separator of claim 15, wherein the rotatable drum consists, except for one or more components of the single multi-part support and drive device of a plastic or a plastic composite material.

* * * * *